3,093,475
METHOD FOR PURIFYING METALLIC INDIUM
John Robert Dyer, Jr., Harts Hill, Whitesboro, N.Y., assignor to The Indium Corporation of America, Utica, N.Y.
No Drawing. Filed Aug. 23, 1960, Ser. No. 51,292
6 Claims. (Cl. 75—63)

This invention relates to the production of high purity indium metal.

In recent years, indium in metallic form has been extensively used in the manufacture of transistors and other types of semi-conductors. As is well known in the art, very small amounts of impurities present in the metals of which such semi-conductors are made may have a seriously detrimental effect on their performance. Conventional commercial processes for the recovery of indium from its ores are readily capable of producing metal that is 99.7% to 99.8% pure. However, there has been an increasing demand from transistor manufacturers for "five nines" indium, i.e., indium having a purity of better than 99.999%.

The procedures previously available for the production of such high purity indium are expensive and time-consuming. A typical prior art process is disclosed, for example, in Lebedeff Patent 2,797,159. In accordance with the Lebedeff process, molten indium is chlorinated to form indium monochloride. As the chlorination proceeds, impurities such as lead, tin, bismuth and silver concentrate in the molten indium. When the chlorination has proceeded to about 95%, the indium monochloride is separated and dissolved in water, whereupon it disproportionates to precipitate relatively pure indium and form indium trichloride which remains dissolved in the water.

While this process produces a relatively pure product, it is open to the rather serious objection that it gives a relatively low yield of pure indium. Both the elemental indium in the first stage of the process having the impurities concentrated therein and the indium trichloride which remains dissolved in the precipitating medium must be reprocessed before they can be used again in the purification process. Only about a third of the indium is recovered as pure product.

Accordingly it is a principal object of the present invention to provide an improved process for producing indium metal having a purity of at least "five nines." It is another object of the invention to provide a process which gives a high yield of the pure indium. It is still another object of the invention to provide a relatively simple process for making such high purity indium that employs inexpensive easily obtainable reagents. It is a still further object of the invention to provide a process of this type that employs reagents that are readily available in a form free from impurities that might contaminate the indium being processed. Other objects of the invention will be in part obvious and in part pointed out hereafter.

It is evident that in the process of the Lebedeff patent, the indium is in effect extracted from its impurities. The present process differs from methods such as those disclosed in the Lebedeff potent in that the impurities are directly extracted from the indium. It has been found that the principal impurities present in commercial indium including copper, iron, nickel, cadmium, lead, tin and silver can be largely extracted therefrom by an alkali metal cyanide solution under suitable conditions as indicated hereafter. The impurities apparently react with the alkali metal cyanide to form complex compounds that are readily soluble in the solution and hence such solvent extraction provides a convenient and efficient means of purifying the indium metal.

In order to achieve an efficient extraction of the metallic impurities, intimate contact between the indium and the extracting solution is essential. Such intimate contact is achieved in accordance with the present process by carrying out the extraction at a temperature at which the indium is molten, i.e., a temperature above 157° C., and by vigorously agitating and mixing the two liquid phases. A mixing temperature of 160° C. to 170° C. has been found satisfactory. It is also possible to spray the molten indium into a body of the cyanide solution, although this has been found to be a somewhat less effective procedure.

Since the extraction is carried out above the melting point of indium, the solvent used in the extracting solution is desirably one having a relatively high boiling point to avoid the necessity for operating at elevated pressures. Any of a large number of organic solvents known to have boiling points above the melting point of indium can be employed. The choice of a solvent is largely dictated by its ability to dissolve the alkali metal cyanide, those having good solvent power for the cyanide being preferred. Useful solvents include, for example, polyhydric alcohols, such as the glycols and glycerine. The preferred solvent is ethylene glycol.

While any of the alkali metal cyanides may be used, potassium cyanide is usually preferred because of its greater solubility in the solvents employed. The concentration of cyanide in the extracting solution does not appear to be particularly critical. In general the stronger solutions seem to be more effective and therefore ordinarily the extracting solution is desirably a sautrated or nearly saturated solution of the cyanide in the solvent.

The relative portions of cyanide solution and indium also appear to be essentially non-critical. It is desirable to have a substantial excess of the cyanide over that stoichiometrically required to remove the impurities, but since the total amount of impurities is very small, such an excess can be achieved with a wide variation in the ratio of indium to cyanide solution used. Good results have been obtained when employing roughly equal volumes of molten indium and extracting solution.

Where maximum purity is desired, the extraction is desirably carried out in several stages with fresh cyanide solution being used in each stage. It has been found that a very substantial reduction in the amount of impurities occurs in the first stage extraction. Further quantities are removed in the second and third stage extraction, but there seems to be little advantage in using more than three stages. Countercurrent extraction, either batch or continuous, may also be used.

It has been further found that improved extraction is obtained if the molten indium is blown with air before being treated with the extracting solutions and also between the several stages of extraction in those cases where multi-stage extraction is employed. When air is blown into the molten indium, a certain amount of drossing of the indium occurs, possibly oxidizing some of the impurities and converting them into a form more readily soluble in the cyanide solution. Although the present process is operative without such aeration, the use of air significantly increases the amount of lead, tin and iron extracted, particularly in the first extraction stage.

In order to point out more fully the nature of the present invention, the following specific example is given of an illustrative embodiment of the present process: A heated extracting kettle provided with an agitator was charged with 36 pounds of indium and the indium was heated to a temperature of 160° to 170° C., during the course of which heating it melted. A gallon of ethylene glycol having one pound of potassium cyanide dissolved therein was added to the indium in the kettle and the cyanide solution and indium were vigorously agitated at 160° to 170° C. for one hour.

At the end of one hour the cyanide-glycol solution was removed by siphoning and a second portion of the cyanide-glycol solution added and the treatment repeated for another hour. The second treatment was followed by a third and similar treatment, after which the molten indium was cast into ingots and analyzed. The analysis showed that the metal impurities in the indium had been reduced by about 90%, the total of such impurities in the product being less than 0.001% by weight.

From the foregoing description it should be apparent that the present process provides a very simple and effective way of removing small amounts of metallic impurities from indium to produce a high purity product. This process presents a very substantial advantage over the prior processes for producing indium of comparable purity in that only a very small amount of indium is consumed in the process. Thus indium of high purity can be produced more economically by the present process.

It is of course to be understood that the foregoing example is intended to be illustrative only and that numerous changes can be made in the ingredients, proportions and operating conditions described therein without departing from the spirit of the invention as set forth in the appended claims.

I claim:

1. The method of refining elemental indium containing small amounts of impurities selected from the group consisting of copper, iron, nickel, cadmium, lead, tin and silver and combinations thereof, which comprises intimately mixing said indium in molten form with a solution of alkali metal cyanide in a high boiling organic solvent at a temperature between the melting point of indium and the boiling point of said solvent to extract at least a substantial part of said impurities from said indium, separating the molten indium from the solvent solution and recovering the purified indium.

2. The method of refining elemental indium containing small amounts of impurities selected from the group consisting of copper, iron, nickel, cadmium, lead, tin and silver and combinations thereof, which comprises blowing air through molten indium to oxidize at least a part of said impurities, intimately mixing the air-blown indium with a solution of alkali metal cyanide in a high boiling organic solvent at a temperature between the melting point of indium and the boiling point of said solvent to extract at least a substantial part of said impurities from said indium, separating the molten indium from the solvent solution and recovering the purified indium.

3. The method of refining elemental indium containing small amounts of impurities selected from the group consisting of copper, iron, nickel, cadmium, lead, tin and silver and combinations thereof, which comprises intimately mixing said indium in molten form with a solution of alkali metal cyanide in a high boiling organic solvent at a temperature between the melting point of indium and the boiling point of said solvent to extract at least a substantial part of said impurities from said indium, separating the molten indium from the solvent solution, repeating the solvent extraction and separation steps at least once therefor using fresh quantities of alkali metal cyanide solution for each extraction step to extract further amounts of said impurities, and thereafter recovering the purified indium.

4. The method of claim 3 wherein the molten indium is blown with air to oxidize at least a part of the impurities prior to each extraction step.

5. The method of refining elemental indium containing small amounts of impurities selected from the group consisting of copper, iron, nickel, cadmium, lead, tin and silver and combinations thereof, which comprises intimately mixing said indium in molten form with a solution of potassium cyanide in a glycol at a temperature between the melting point of indium and the boiling point of said glycol to extract at least a substantial part of said impurities from said indium, separating the molten indium from the solvent solution and recovering the purified indium.

6. The method of refining elemental indium containing small amounts of impurities selected from the group consisting of copper, iron, nickel, cadmium, lead, tin and silver and combinations thereof, which comprises intimately mixing said indium in molten form with a solution of potassium cyanide in ethylene glycol at a temperature of 160° to 170° C. to extract at least a substantial part of said impurities from said indium, separating the molten indium from the solvent solution, and recovering the purified indium.

References Cited in the file of this patent
UNITED STATES PATENTS

| | | |
|---|---|---|
| 2,797,159 | Lebedeff et al. | June 25, 1957 |
| 2,901,342 | Siemons | Aug. 25, 1959 |